United States Patent [19]

Mouton, Jr. et al.

[11] 4,219,303
[45] Aug. 26, 1980

[54] SUBMARINE TURBINE POWER PLANT

[76] Inventors: William J. Mouton, Jr., Box 10515, New Orleans, La. 70181; David F. Thompson, 2540 Green St., Chester, Pa. 19013

[21] Appl. No.: 846,069

[22] Filed: Oct. 27, 1977

[51] Int. Cl.² .............................. F01D 1/26; F03D 1/02
[52] U.S. Cl. .......................................... 415/7; 415/68; 415/122 A; 415/201; 416/85; 416/121; 416/DIG. 4
[58] Field of Search .................. 415/7, 8, 77, 68, 201, 415/91, 122 A, 118, 2 A; 416/85, 86, 84, 121 A, 189 A, DIG. 6

[56] References Cited

U.S. PATENT DOCUMENTS

| 337,864 | 3/1886 | Pidgeon | 416/DIG. 6 X |
|---|---|---|---|
| 654,654 | 7/1900 | Lawrence | 415/68 |
| 739,413 | 9/1903 | Handel | 416/DIG. 6 X |
| 1,018,278 | 2/1912 | Tappan | 415/201 X |
| 2,501,696 | 3/1950 | Souczek | 416/85 |
| 2,782,321 | 2/1957 | Fischer | 415/122 A X |
| 2,801,069 | 7/1957 | Campbell | 415/68 |
| 3,521,214 | 9/1970 | Abramson | 415/68 |
| 3,986,787 | 10/1976 | Mouton et al. | 415/7 |
| 4,166,596 | 9/1979 | Mouton et al. | 415/2 X |

FOREIGN PATENT DOCUMENTS

| 211360 | 2/1956 | Australia | 416/189 A |
|---|---|---|---|
| 117345 | 4/1930 | Austria | 415/7 |
| 601140 | 7/1960 | Canada | 415/68 |
| 632319 | 9/1938 | Fed. Rep. of Germany | 416/DIG. 4 |
| Ad.56102 | 9/1952 | France | 416/189 A |
| 316900 | 12/1956 | Switzerland | 415/68 |

*Primary Examiner*—Everette A. Powell, Jr.
*Attorney, Agent, or Firm*—Rollin D. Morse

[57] ABSTRACT

A power plant for the generation of electricity from the flow of water currents uses turbine wheels within nozzles submerged in the water current, anchored to the bottom of the water course, as for example, the ocean, and self-buoyed to a level well below the water surface. Pairs of counter-rotating turbines are supported by their rims, which bear against friction drive wheels, which in turn drive electrical generators contained in water-tight machine rooms within the wall of the nozzle. A structural design is disclosed, providing for the building of modules of the nozzle ashore, which modules may then be barged to the deep-water site for assembly into the whole power plant.

2 Claims, 8 Drawing Figures

SUBMARINE TURBINE POWER PLANT

REFERENCE TO EARLIER APPLICATIONS AND PATENTS

This application concerns improvements over inventions disclosed in U.S. Pat. No. 3,986,787, and in Application Ser. No. 746,971, allowed Sept. 12, 1977, both being to the same inventors as the present application. Reference is made also to applicants' application Ser. No. 764,251, filed Jan. 31, 1977, which discloses the use of counter-rotating turbine wheels rim-driving an electrical generator through right-angle bevel-gear shafting.

Another disclosure of rim-driving of a right-angle bevel gear is contained in U.S. Pat. No. 2,085,282 to Waterval, for a water wheel and propeller.

INTRODUCTION AND OBJECTS

It has long been recognized that the forces of Nature, particularly the winds, the river currents, and the ocean currents, are sources of energy that could be put to the use of man. For centuries, the winds have been used in relatively primitive ways, for the pumping of water, the grinding of grain, and the powering of small mechanical operations. The river currents have long been used for energizing electrical generators by means of turbines. And some small efforts have been made in the more recent past to utilize the currents of the oceans, but little has been achieved in this area of energy conservation.

In the earlier patent and applications of the present inventors, combinations of turbines and nozzles have been claimed by the use of which considerably higher efficiency of removal of energy from flowing currents of fluids, particularly water currents, but also the wind, can be achieved. At these higher achievements, it becomes economically attractive to invest in the equipment needed for the energy recovery. One of the very largest of ocean currents is the Gulf Current, which is that current of ocean that flows out of the Gulf of Mexico in a northerly and northeasterly direction past the east coast of Florida. The size of the Gulf current to the east of Miami, Fla., is more than 50 kilometers wide, as deep as 750 meters, and in central regions 20 kilometers wide and 160 meters deep, velocities of 5 to 7.5 ft. per second have been measured. For such velocities, a turbine intercepting a portion of the current over the area of a 590-foot diameter circle, would have an energy flux exceeding 150 megawatts, from which to withdraw better than one half for mans' use, and yet the fraction would be a completely negligible portion of the whole Gulf Current flux.

Objects of the present invention are to provide a nozzle and turbine system of economical design, adapted to be used in a large water current such as the Gulf Current, to be submerged sufficiently below the surface as to minimize the liklihood of interference with shipping, to be completely self-contained, to be of high hydrodynamic efficiency, and to be adapted to extended operation without heavy labor demands. Another object is to avoid the deleterious effects of storms and wave action, which is achieved by submergence of the power plant to such depths that the uppermost parts are about 100 feet below the water surface.

BRIEF SUMMARY OF THE INVENTION

Broadly, the invention comprises a power plant for the generation of electrical energy from a fluid current in which the plant is immersed, the power plant itself comprising a thick-wall nozzle structure with a through-passageway converging from an entrance to a vena contracta, and then diverging to an exit for the fluid current, there being at the vena contracta an annular recess extending radially outward, the recess carrying an annular array of bearings upon which is borne at least one axle-less turbine wheel, the wheel having a shroud-ring rim which bears against the bearings, the nozzle having an outer bypass surface past which the fluid current that does not enter the nozzle passes; within the thick wall of the nozzle, in the space between the outside of the recess and the inside of the bypass surface, there is located at least one pressure-tight machine-room chamber, with a pressure-tight entrance lock interconnecting the chamber with the bypass surface, and with a packing-gland passage extending radially inward from the chamber into the annular recess. The machine room contains an electrical generator and any needed speed changers and clutch devices, coupled to the shaft extending through the packing gland and its passage, and the shaft on its end within the recess carries a friction roller drivingly engaging the rim of the turbine wheel, whereby rotation of the wheel by the fluid current drives the friction roller, which through its shaft drives the electrical generator.

In preferred form, two counter-rotating turbine wheels, with rims separated by the diameter of the friction rollers, both engage the rollers, and a plurality of machine-room modules are located in the nozzle space around the periphery of the recess, each module including the entire sequence of friction roller, shaft, generator and auxiliaries, pressure-tight chamber, and entrance lock, interconnecting the recess and the bypass surface like spokes of a wheel.

DETAILED DESCRIPTION OF THE INVENTION

Figure 1:
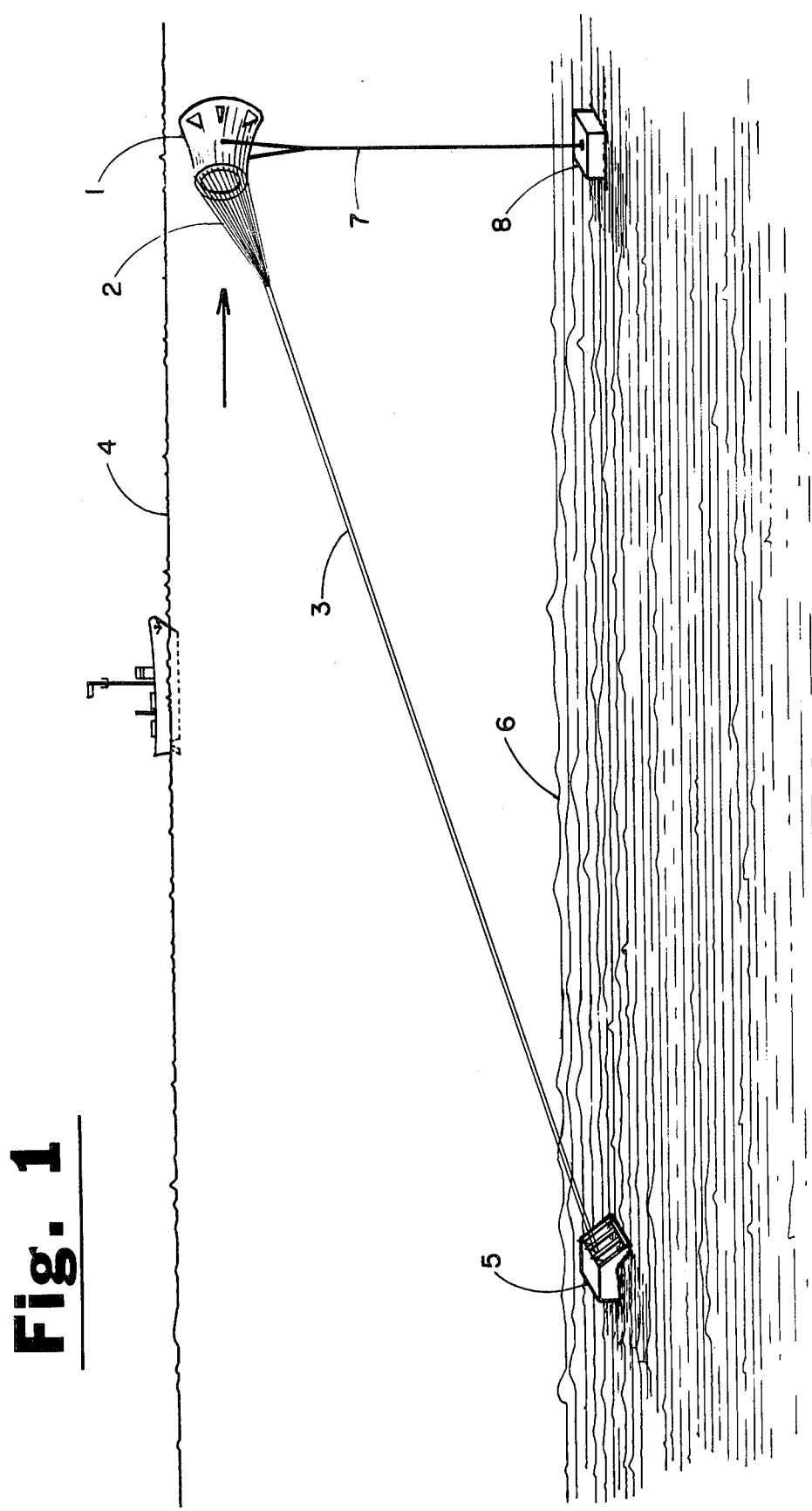
FIG. 1 shows a power plant of the invention, anchored in a current of water, and buoyed by its own internal buoyancy to a position below the surface of the water, where it would not interfere with shipping, nor be influenced by surface waves and storms.

The present invention is applicable to use in fluid currents generally, such as river currents, air currents, but most especially is useful for very large ocean currents. Such a use in ocean currents is depicted in FIG. 1, in which the nozzle of the power plant is designated by the numeral 1, shown in an ocean current moving from left to right. The nozzle 1, as will be explained later, is a buoyant structure, and is organized and tethered with anchor cable to stay at a predetermined depth and location. A cone of cables 2 is attached around the periphery of the entrance 23 to the nozzle (as better seen in FIG. 2). The tip of the cone of cables is attached to a single elongated anchor cable 3, extending downward at an angle to the bottom 6 of the ocean to a large anchor 5. The long cable 3, since it would normally have considerable weight in order to have the strength to withstand the drag of the ocean current on the nozzle, will be made buoyant; one means of providing this buoyancy is by making the cable of synthetic fiber with specific gravity less than 1.0, such as "Kevlar" TM aramid polymer. Intermittent floats could also be used.

Directly below the power plant at its desired location is a second anchor 8, attached by a cable 7 and a bridle of cables 9 to the nozzle 1 amidships. The principal purpose of this cable and anchor is to hold the power plant at a prescribed depth below the surface 4 of the water, where the plant will be insensitive to waves and storms, and will not interfere with the passage of ships above it.

Figure 2:
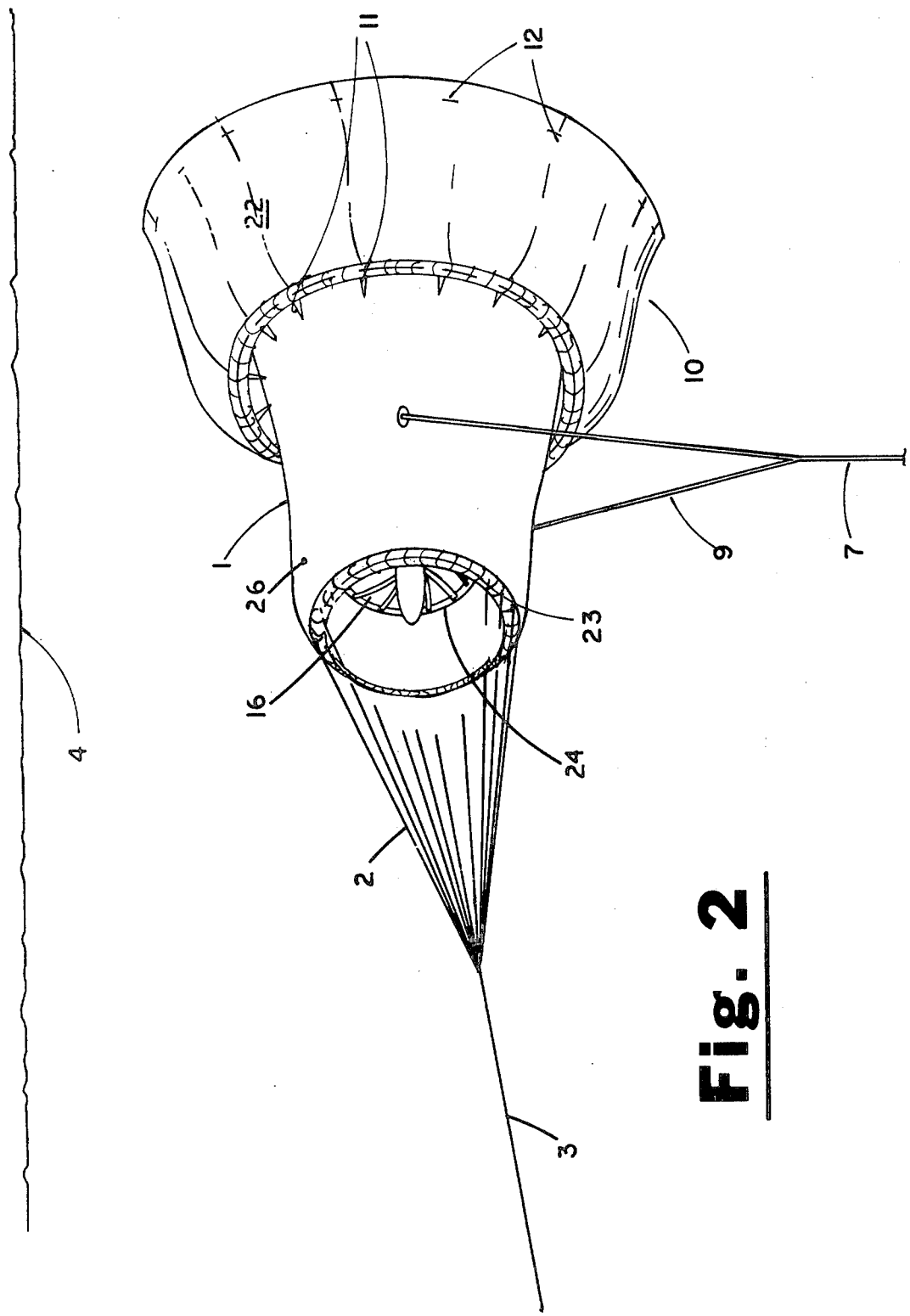
FIG. 2 shows a perspective view of the power plant, with anchor cables, the flaps forming the secondary nozzle, and a portion of the passageway and part of the upstream turbine wheel.

FIG. 2 shows an exterior perspective view of the power plant as seen from its front left side, again, with the flow of water from the left to the right. The nozzle 1 has an interior bypass surface 26 to which the bridle cables 9 are attached amidships. The nozzle also has on its exterior, near its rear end, a set of flaps 10, which are hingedly attached via the hinge pintles 11, that are themselves attached to the nozzle exterior. The pintles are so arranged that the flaps, when swung together to form a smooth surface as depicted in FIG. 2, form a secondary nozzle 22 slightly overlapping the primary nozzle 1.

The flaps are a means of construction of the secondary nozzle, and once swung on their hinge pintles into the nozzle position shown, are pinned together permanently with pinning means 12. During construction in a drydock, with the nozzle tipped up to make its axis vertical, the flaps are installed near the last, making the center of gravity of the whole nozzle somewhat lower because the flaps are then in the folded position. The lower center of gravity makes the nozzle less unwieldy as preparations are made to lower it into the water and to turn it onto its horizontal axis.

In FIG. 2, the primary nozzle entrance 23 can be seen, and inside the entrance, at the vena contracta 24, part of the upstream turbine wheel blades 16 is visible.

Figure 3:
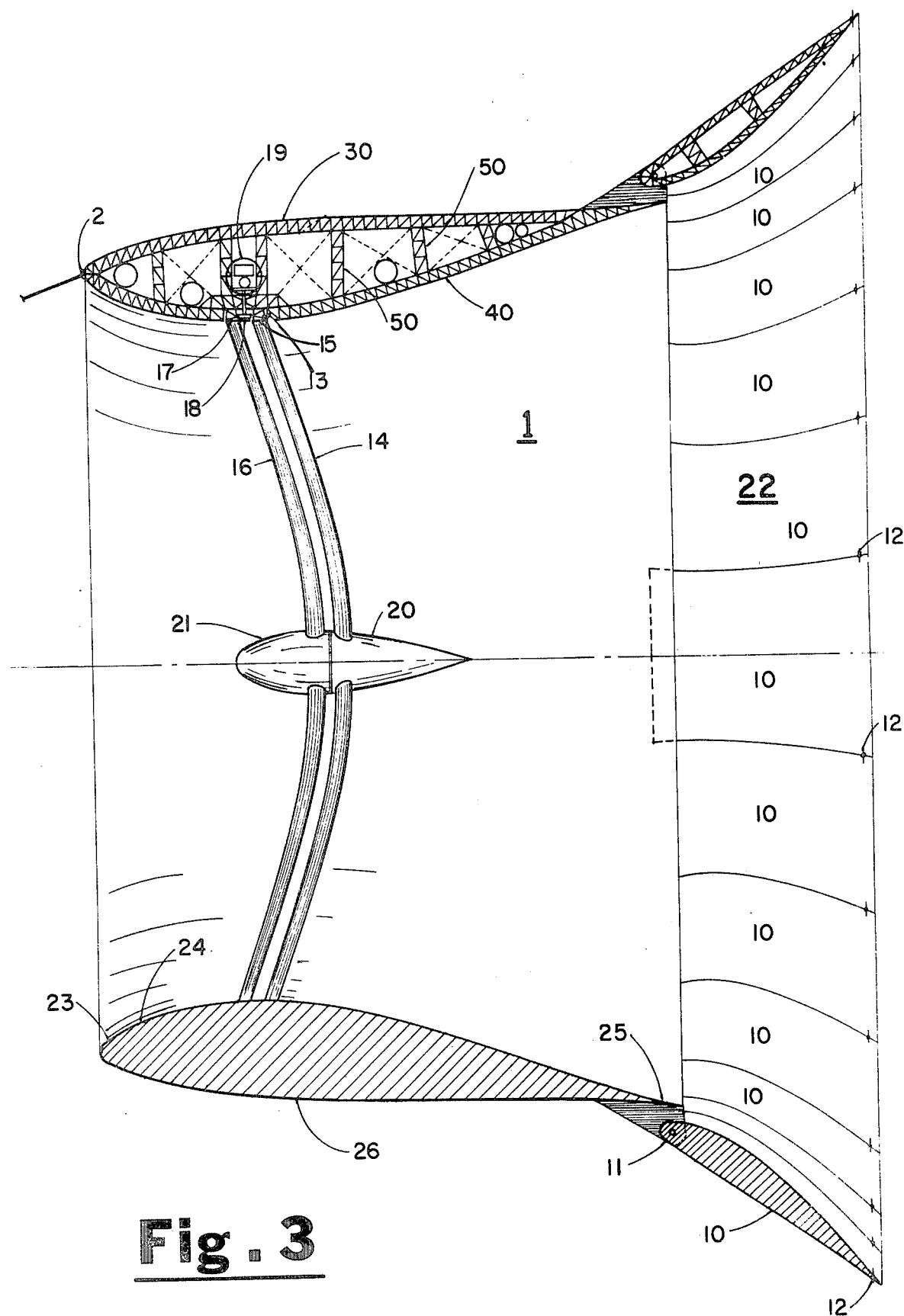
FIG. 3 shows a lengthwise cross section of the nozzle and secondary nozzle, partially in detail.

FIG. 3 shows a longitudinal cross section of the nozzle and turbine wheels. In the upper part of the view, the cross section is detailed, but in the lower part, the detail has not been shown; it will be understood that the lower part, undetailed, actually is similar to the upper part.

Proceeding from the left, one of the cables in the cone of cables 2 may be seen attached to the front, or entrance end, 23, of the nozzle. The exterior of the primary nozzle is shown at 26, and is the outer bypass surface, referred to elsewhere. This outer bypass surface begins at the nozzle entrance 23, with smooth fairing for minimum energy loss, and continues the length of the nozzle, meeting the discharge with a smooth connection at 25. The interior of the nozzle begins with its entrance 23, after which the diameter reduces somewhat to the diameter at the vena contracta 24, and then expands again to a considerably larger diameter at its discharge 25.

At the vena contracta, or near it, the smooth passageway through the nozzle is interrupted by the annular recess 13, extending radially outward, and providing a receptacle within which the rims of the turbine wheels, the bearings for the wheels, and the power take-off rollers may be mounted, while yet providing a smooth transition through the turbine wheels from the nozzle both before and after the wheels. These details will be discussed in connection with FIG. 5.

In FIG. 3 there are also shown two turbine wheels in section. The upstream wheel has a hub designated 21, relaxed catenary blades 16, and shroud-ring rim 17. The relaxed catenary blade structure is the subject of Application Ser. No. 764,251 filed Jan. 31, 1977, and now allowed. It is to be noted that the several blades of the turbine extend from the inside of the rim 17 to the point of attachment within the hub 21, and that the main purpose of the hub is not to form part of an axle. The main purpose of the hub is to join the ends of the blades to one another, to transfer the tensions across the wheel's center from blade to blade. The hub also provides smooth fairing at this junction point, whereby fluid pressure losses are minimized.

Figure 4:
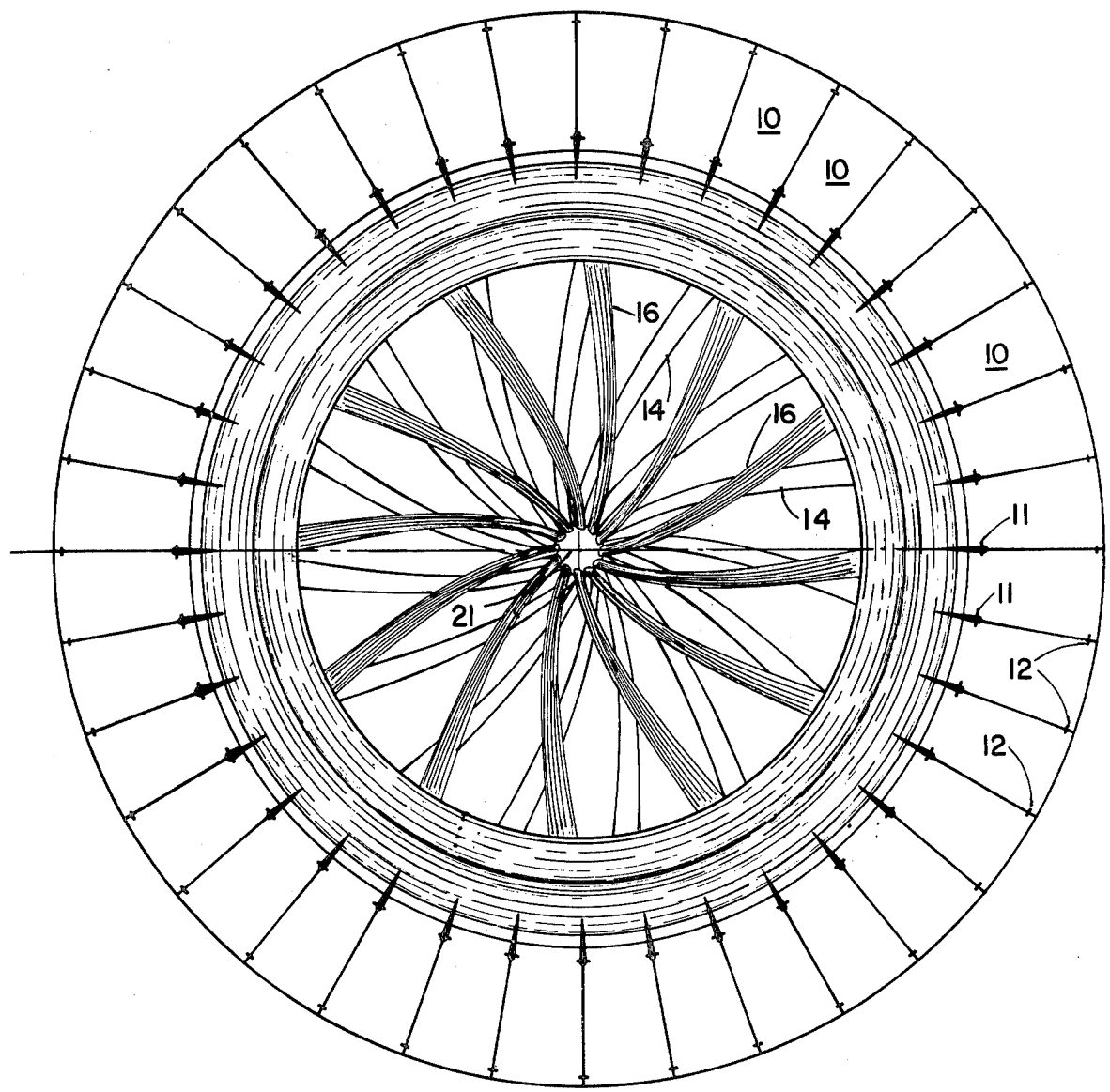
FIG. 4 shows a front, head-on, view of the nozzle, the upstream turbine wheel blades, and behind them the blades of the downstream turbine.

Behind the above described turbine wheel there is in the preferred mode a second turbine wheel with blades tilted in the opposite direction to those of the upstream wheel, whereby the two wheels counter-rotate with respect to one another. The hub of the second wheel is designated 20, its blades are 14, and its shroud-ring rim is 15. In FIG. 4, looking into the front of the nozzle, one can see the front hub 21, the upstream blades 16, and behind them the downstream blades 14. It can be seen from these two views that the blades are of relaxed catenary form not only in the fluid flow direction, but also in the direction around the axis toward which they are thrust by the fluid forces.

The upper part of the section of the nozzle shown in FIG. 3 also shows the metal framing structure in longitudinal view, the machine room 19, and some buoyancy tanks 55. Not detailed are pipes, pumps, valves, and air supply and storage facilities that will be used in obtaining proper balance of buoyancy.

Figure 8:
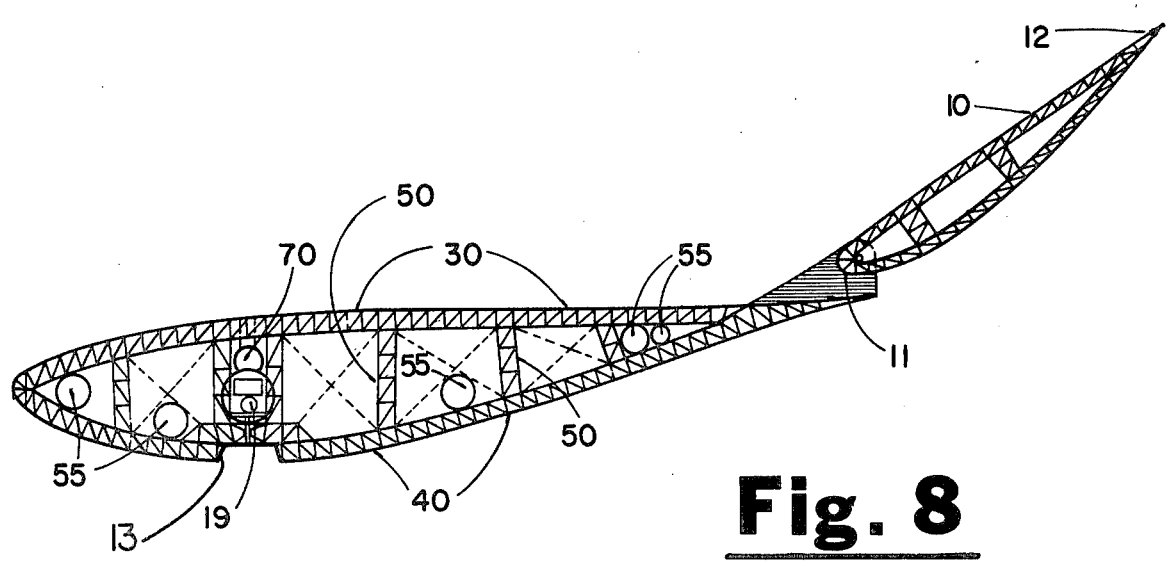
FIG. 8 shows a longitudinal section of one of the lengthwise structural frameworks.
Figure 7:
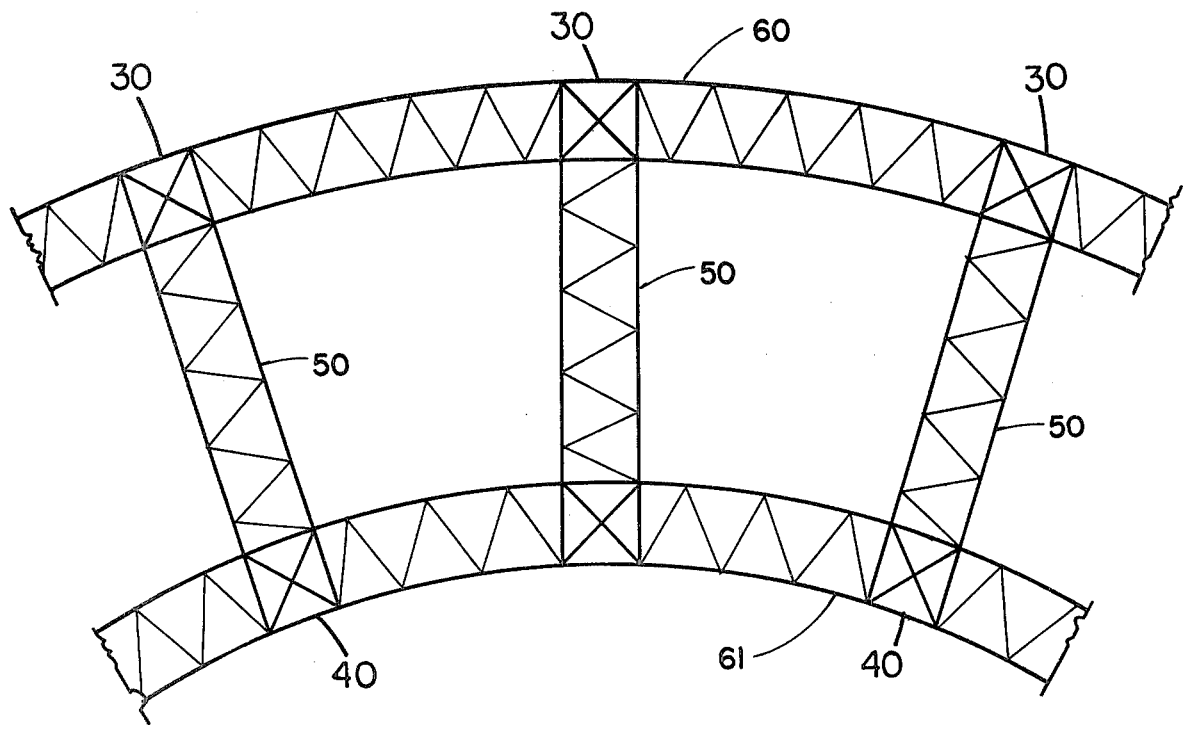
FIG. 7 shows a partial cross section of the structural framework in some what larger scale than the preceding view.

The metal framing of the nozzle will be discussed later, in connection with FIGS. 7 and 8.

Figure 5:
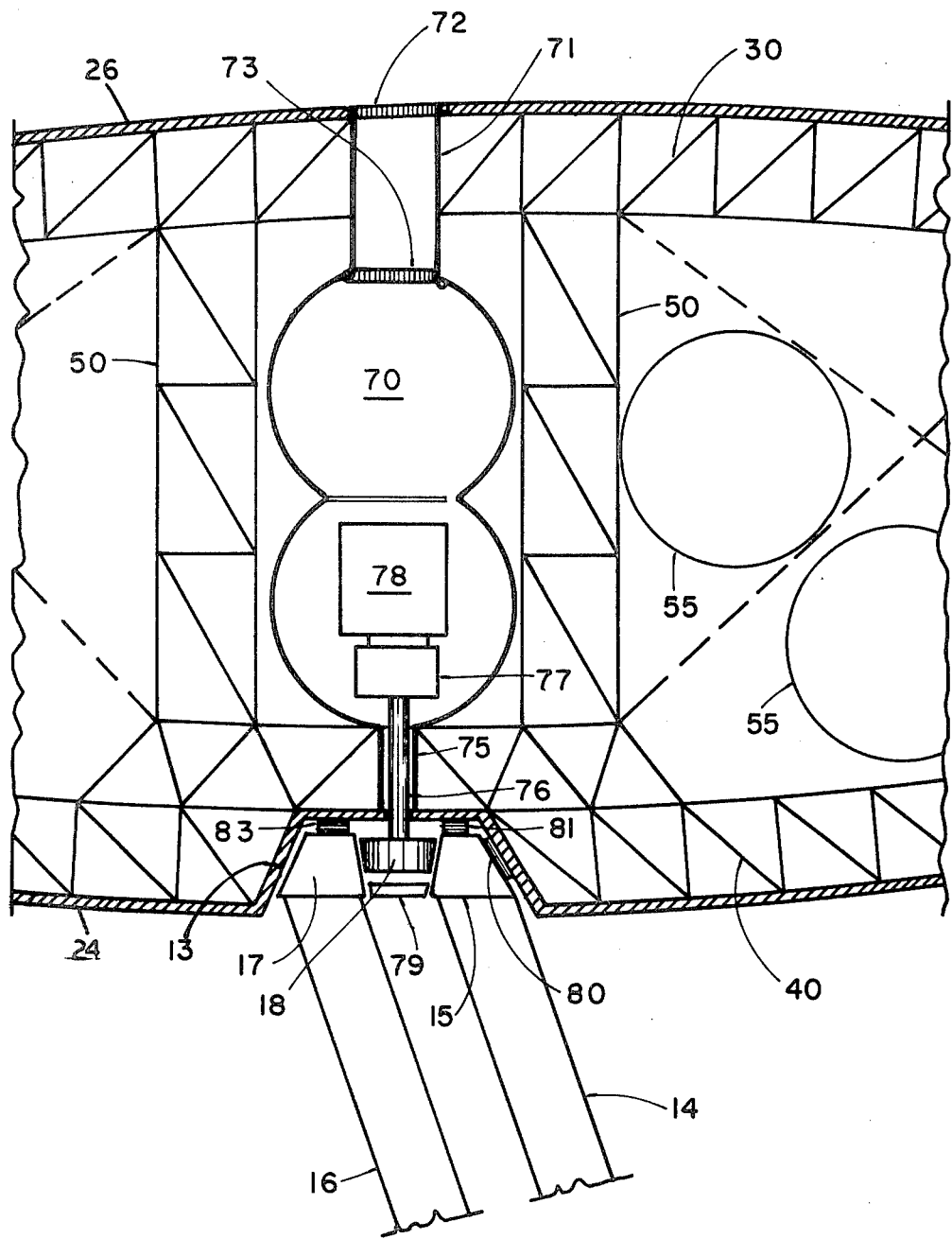
FIG. 5 shows a longitudinal section of part of the upper part of the nozzle, the turbine wheels' rims, and the recess with bearings, the friction roller, shaft and packing gland, the machine room and its machinery, and the entrance lock.

FIG. 5 shows in somewhat more detail than the previous figures a cross section of the nozzle wall, to show the interior arrangements and the system for extracting power from the turbine wheel. The inner wall of the nozzle is designated 24 at the vena contracta, that being the part of the passageway through the nozzle where the diameter is at a minimum. Close to the vena contracta, and cut into the wall of the passageway is the annular recess 13, extending radially outward from the vena contracta, and forming a space into which can be fitted the rim or rims of the turbine wheel or wheels, the bearings for the support of the wheels, and the power take-off rollers leading to the electrical generators.

The downstream wheel and its mounting will be described first. The wheel (or wheels in the preferred embodiment) is not supported on an axle or central shaft, but rather rolls on its own rim against the surface of suitable bearings. There are forces in two directions to be resisted, namely the downward force of gravity because of the weight of the wheel, and the force of the current of water passing through the wheel, forcing in an axial direction. For the gravitational force, the inside of the cylindrical wall of the recess is provided with a set of bearings 81 entirely around the perimeter, although most of the load is, of course, downward. There may be vibrational forces or other causes tending to move the wheel radially in directions other than down.

The force from the water current is resisted by providing the downstream inner face of the recess with a set of bearings 80 distributed at intervals around the entire perimeter of the recess wall.

The exact nature of the bearings is not part of the present invention, but preferably water bearings as disclosed in U.S. Pat. No. 3,986,787 will be used.

Figure 6:
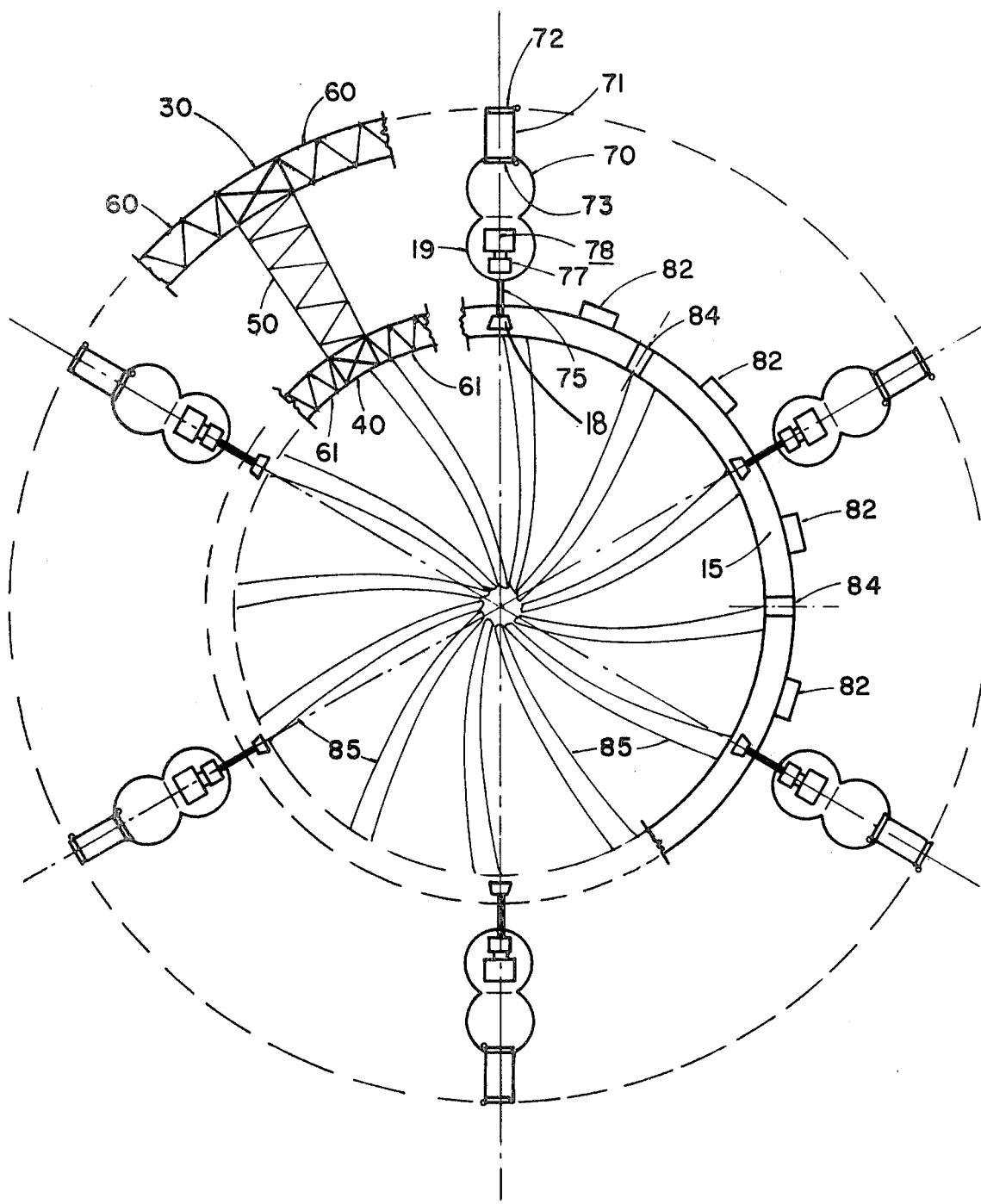
FIG. 6 shows diagrammatically in cross section at the vena contracta, the arrangement of the several machine room modules around the periphery of the recess, and some parts of the structural framework.

In the preferred form of the invention, a second turbine wheel, with blades tilted counter to the downstream wheel, will be positioned a short distance upstream. The upstream wheel, with rim 17, blades 16, and hub 21, will be supported on bearings 83 against all radial forces, including weight. In the small space between the rims of the two wheels there will be a set of trunnion, or roller bearings 84, (See FIG. 6) holding the two wheels apart, allowing the wheels individually to rotate. The space between the turbine rims will be covered with a smooth fairing 79, being an extension of the passageway surface. Between the trunnions 84, at at least one location there will be provided a power take-off means. Preferably there will be several such means; for example, in FIG. 6, there are six power-take-off means. Returning to FIG. 5, the power take-off begins with a friction drive roller 18, which is sandwiched between the upstream face of the rim 15, and the downstream face of rim 17. Pressure of the passing fluid stream against blades 16 forces rim 17 against roller 18, which is in turn forced against rim 15. By proper design, the force is sufficient that the required friction is generated to rotate the roller 18 and transfer the power to the next stage. This next stage is the shaft 76, to which the roller is attached. The shaft 76 passes through a packing gland and set of bearings 75, into generator machine room 19, where the shaft is drivingly attached to speed changer 77, which in turn drives generator 78. Not shown in the drawings are several important details, including the following:

a. Clutch means; this may comprise a facility for sliding the friction roller lengthwise up its shaft, whereby to disengage it from being driven by the wheels.

b. Generator wiring, controls, excitation and related electrical features.

c. Life-support facilities for operators in the machine room. The machine room and its facilities, other than those just mentioned, will now be described. FIG. 3 shows a single spherical enclosure as the generator room, whereas FIGS. 5 and 6 show two spherical enclosures 19 and 70, joined to one another with a large opening between the two enclosures. These two forms are simply variations of the basic idea that there must be a space for each generator and its auxiliaries, including maintenance facilities and spare parts storage, and that this space must be enclosed within walls strong enough to resist the pressure of the surrounding ocean, at least to the depth at which the bottom-most machine room would be located, and preferably to the maximum depth of the ocean in the region where the power plant would be used, so that catastrophic destruction would not ensue if the plant were inadvertently sunk.

Whether the machine room is a single sphere, or a double one, or some other shape, is not a feature of the present invention. In any event, it is desirable to provide access to the machine room, for routine inspection, and for such maintenance as could be carried out without drydocking the whole plant, or without raising it to the ocean surface by detaching or lengthening cable 7. Such access is indicated diagrammatically by the entrance lock 71, provided with an outside cover or hatch 72 set flush with the surface 26 of the nozzle, and an inside cover 73, connecting the inside of the entrance lock with the inside of the machine room. With this lock there would be provided conventional means for blowing the water out of the lock, after the outer cover had been secured.

The discussion of the power generation facility so far has related to a single facility within the nozzle. It is much to be preferred, however, that several generators and their auxiliaries should be connected to a single pair of turbine wheels. Thereby, in the event of failure of one unit, automatic disconnect and declutching facilities can remove the failed unit from service. The other units can remain on line, providing their fraction of the total output, until such time as it is convenient to repair the faulty unit. Likewise, the faulty unit, except in the event of major breakdown, can be repaired without removing the other units from service, and without drydocking the whole plant. Further, by the use of a plurality of units, they can be arranged symmetrically around the periphery of the wheels, within the nozzle, and the balanced arrangement will be dynamically and structurally better.

This symmetrical arrangement is shown in FIG. 6, where six generator units 78 are arranged around the nozzle at intervals of 60 degrees from one another. In this view, in partial section, and partially taken apart, the forward or upstream turbine wheel has been removed, and it can be seen that the rollers 18 bear on the upstream face of the rim 15 of the downstream turbine.

In the very large generator systems envisioned for this invention, the 60 degree separation of the friction rollers would leave the rim of the upstream wheel unsupported over long distances under the stream-direction forces, tending to bend the rim between the rollers, in a direction toward the rim of the downstream turbine. Such bending is prevented to any necessary degree in the present power plant, by providing roller trunnions intermediate the friction rollers, in the space between the downstream rim of the upstream turbine, and the upstream rim of the downstream turbine. These trunnion rollers are designated 84 in FIG. 6.

Another important feature of the present invention is the structure of the nozzle, which is envisioned as a very large structure that can be made in small sections and modules, loaded on barges, towed to a selected site, and there assembled either in floating drydock, or from a circle of barges that in effect almost form a drydock. FIG. 3 shows in the upper part a longitudinal section of the nozzle framing structure, which is more clearly shown in FIG. 8. Also in FIG. 5, some of the framing is shown in the vicinity of the machine room and the annular recess. FIG. 6 shows in the upper left one of the spokes, or towers, connecting between the inner segmental truss ribs, and the outer segmental truss ribs, and this structure is shown in more detail and at larger scale in FIG. 7. Referring to FIG. 8, in longitudinal section, the nozzle is formed of an array of elongated trusses 30 along its outside periphery, and a second array of inner longitudinal trusses 40, framing the wall of the nozzle passageway. These longitudinal trusses are arranged at close intervals around the circumference of the nozzle. In the specific instance depicted, they are spread at 10 degree spacing from one another, although other spacings would be possible. The outer trusses meet the inner trusses at the nose and at the tail of the nozzle. Along their length, they are spaced apart, and held at their spacings by tower trusses 50, which extend radially from each inner to its mating outer truss, as from truss 40 to truss 30 in FIGS. 7 and 8. Each of the complete longitudinal trusses is held in spaced relationship around the circumference of the nozzle by the previously mentioned segmental trusses, designated 60 for the outer trusses and 61 for the inner trusses. It will be readily apparent that each of these trusses can be made up in relatively short lengths and small pieces by standard structural manufacturers, the pieces can be readily shipped by barge to the site of intended use, and can there be assembled with the aid of a drydock or a circle of barges, aided by conventional structural cranes and technology. As each section is added on, its skin of sheet material (metal or plastic) can be applied. While the structure is being built, the buoyancy tanks, machine rooms, even the turbine wheels, and the various unnamed auxiliary components can be placed within the structure.

Desirably, the nozzle assembly will be made with the axis vertical, and begun at the nose, and built up layer by layer, finally installing the preassembled flaps in the folded back position. Having pumped and sealed the flotation tanks, the whole nozzle will then be lowered vertically into the water; when the flaps are near water level, they will be swung into position forming the secondary nozzle, and then locked to one another with anchoring pins 12.

As suggested by the drawings, each of the structural modules of the trusses is made up of conventional "bridge truss" elements, with most components of pipe or tube, and with tension cable bracing across the diagonals of the larger quadrilateral assemblies, as suggested by the dotted lines in the cross section of FIG. 3.

For use in ocean environment, certain aluminum alloys are available, that are resistant to corrosion, and can be readily welded. It is envisioned that the framing will be covered with a sheet aluminum skin, primarily to minimize frictional drag of the passing ocean current upon the structure, but that the structure, except in the buoyancy tanks and machine room, and similar undescribed elements, will be flooded with water.

Applicants have disclosed their invention in considerable detail. Variations of the invention may be made without departing from the essence of the invention, and applicants are to be limited only by the following claims.

What we claim is:

1. An electrical power plant for the recovery of hydrodynamic energy from a free-flowing current of water, comprising
   (1) an annular nozzle for intercepting a portion of the current and permitting the remainder of the current to by-pass the nozzle,
   (2) the nozzle having an inner wall forming a through passageway for the intercepted portion, the passageway converging from an entrance end to a vena contracta, then diverging to a discharge end,
   (3) the nozzle having an outside by-pass surface extending from the entrance end to the discharge end, the inner wall and the outside surface together forming an annular chamber around the vena contracta, the inner wall having
   (4) an annular recess at the vena contracta extending radially outward from the inner wall into the said annular chamber, the recess having an outer wall, an upstream wall, and a downstream wall, and
   (5) at least one pressure-tight generator chamber constructed within the said annular chamber, and having an entrance lock in the said by-pass surface, and a generator shaft passage extending radially inward and piercing the outer wall of the said annular recess.
   (6) a pair of axle-less, counter-rotating, co-axial turbine wheels, (an upstream wheel and a downstream wheel) having shroud-ring rims supported within the said annular recess upon
   (7) bearing means carried by at least one of the downstream, outer, and upstream walls of the said recess, the bearing means supporting the turbine wheels for free rotation against radial forces, gravity, and axial fluid forces, and
   (8) bearing means between the wheels separating them from one another,
   (9) the said shroud-ring rims having inner diametric shapes for smooth flow of the water currents through the vena contracta and the wheels, and
   (10) the rim of the upstream wheel having a bevelled downstream face, the rim of the downstream wheel having a bevelled upstream face,
   (11) a bevelled friction drive roller carried on a generator shaft in the generator shaft passageway,
   (12) the bevels of the said rims and of the friction-drive roller being designed to cooperate for driving engagement of the roller by the two bevelled rims.

2. The power plant of claim 1, in which clutch means is provided for sliding the friction drive roller radially outward on its shaft, whereby to disengage the pinion from the turbine wheel rims.

* * * * *